United States Patent
Macdonald et al.

(10) Patent No.: US 12,475,284 B2
(45) Date of Patent: Nov. 18, 2025

(54) INTEGRATED CIRCUIT GENERATION USING AN INTEGRATED CIRCUIT SHELL

(71) Applicant: SiFive, Inc., San Mateo, CA (US)

(72) Inventors: Ryan Macdonald, San Francisco, CA (US); Erik Arthur Danie, Oakland, CA (US); Wesley Waylon Terpstra, San Mateo, CA (US); Yunsup Lee, Redwood City, CA (US)

(73) Assignee: SiFive, Inc., Santa Clara, CA (US)

( * ) Notice: Subject to any disclaimer, the term of this patent is extended or adjusted under 35 U.S.C. 154(b) by 555 days.

(21) Appl. No.: 17/992,976

(22) Filed: Nov. 23, 2022

(65) Prior Publication Data

US 2023/0195980 A1    Jun. 22, 2023

Related U.S. Application Data

(60) Provisional application No. 63/290,684, filed on Dec. 17, 2021.

(51) Int. Cl.
*G06F 30/31*     (2020.01)
*G06F 30/327*    (2020.01)

(52) U.S. Cl.
CPC ............ *G06F 30/31* (2020.01); *G06F 30/327* (2020.01)

(58) Field of Classification Search
CPC ..................................................... G06F 30/31
USPC ........................................................ 716/119
See application file for complete search history.

(56) References Cited

U.S. PATENT DOCUMENTS

| 7,013,438 B1 * | 3/2006 | Saldanha .............. G06F 30/327 |
| | | 716/122 |
| 2020/0349236 A1 | 11/2020 | Chen |
| 2020/0387659 A1 | 12/2020 | Wachs et al. |

OTHER PUBLICATIONS

Shell-Design Split by terpstra—Pull Request #28—sifive/fpga-shells, Accessed Nov. 2, 2021, 5 pages.
Shell Design Refactoring Enhancements by sagark—Pull Request #34—sifive/fpga-shells, Accessed Nov. 2, 2021, 3 pages.

* cited by examiner

*Primary Examiner* — Eric D Lee
(74) *Attorney, Agent, or Firm* — Kilpatrick Townsend & Stockton LLP

(57) ABSTRACT

Systems and methods are disclosed for integrated circuit design using integrated circuit shells. For example, a system may generate an integrated circuit core design expressed in a hardware description language. The integrated circuit core design may express circuitry that describes one or more functions to be included in an application specific integrated circuit (ASIC). The one or more functions may have connection points providing first inputs and outputs to the one or more functions. The system may query an integrated circuit shell expressed in a hardware description language. The integrated circuit shell may express circuitry that describes a limited set of pads to be implemented in the ASIC. The limited set of pads may provide second inputs and outputs to the integrated circuit. The query may determine availability of pads of the limited set of pads to connect to the connection points of the one or more functions.

20 Claims, 10 Drawing Sheets

INTEGRATED CIRCUIT GENERATION USING AN INTEGRATED CIRCUIT SHELL

CROSS-REFERENCE TO RELATED APPLICATION(S)

This application claims priority to and the benefit of U.S. Provisional Patent Application Ser. No. 63/290,684, filed Dec. 17, 2021, the entire disclosure of which is hereby incorporated by reference.

TECHNICAL FIELD

This disclosure relates generally to integrated circuits, and more specifically, to integrated circuit generation using an integrated circuit shell.

BACKGROUND

Integrated circuits may be designed and tested in a multi-step process that involves multiple specialized engineers performing a variety of different design and verification tasks on an integrated circuit design. A variety of internal or proprietary (e.g., company-specific) integrated circuit design tool chains may be used by these engineers to handle different parts of the integrated circuit design workflow of using commercial electronic design automation (EDA) tools.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
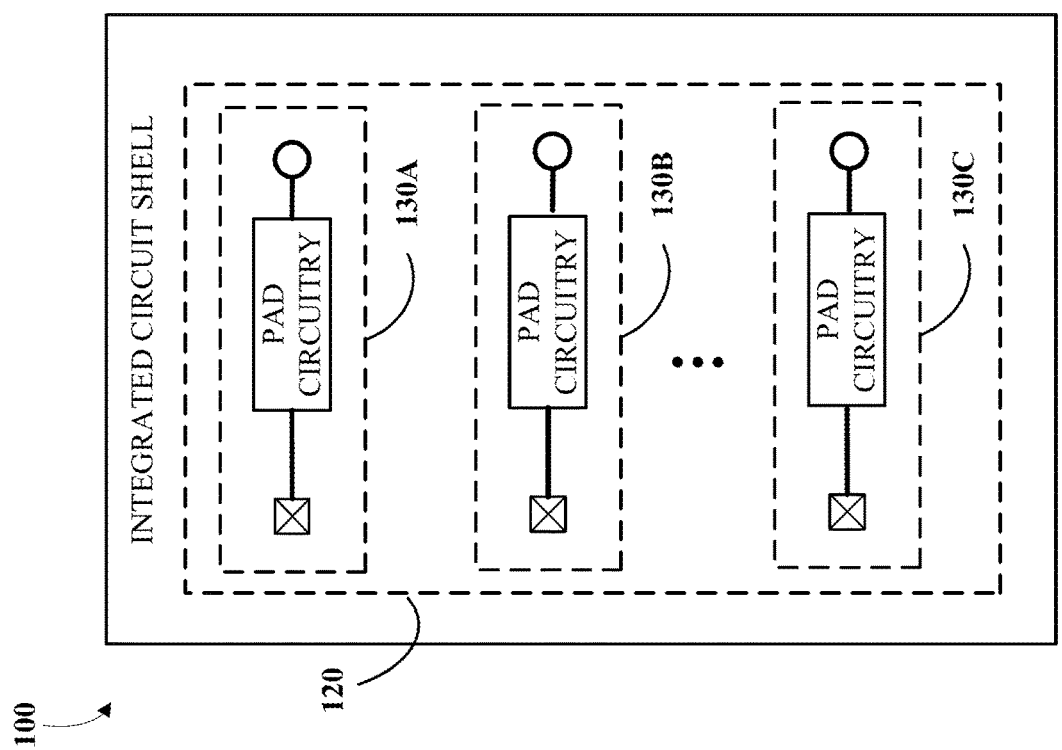
FIG. 1 is block diagram of an example of an integrated circuit shell.

Automated generation of integrated circuit designs permits a chip configuration of an application specific integrated circuit (ASIC), or system on a chip (SoC) implementation of an ASIC, to be specified in terms of design parameter values (or colloquially knobs). A system may then automate the operation of commercial electronic design automation (EDA) tools for design of the integrated circuit using the design parameter values. A user may select a template and make customizations to the template, such as by adding or subtracting circuitry associated with intellectual property (IP) blocks or "functions," to build the design. The functions may include, for example, support for double data rate (DDR) memory; peripheral component interconnect express (PCIe); general purpose inputs and outputs (GPIOs); universal asynchronous receiver-transmitter (UART) communication; serial peripheral interface (SPI) communication; pulse-width modulation (PWM) communication; and inter-integrated circuit ($I^2C$) communication.

Providing many integrated circuit design templates, with various templates permitting customizations, offers flexibility to users. For example, a user may select a template and functions to configure a design that is customized to a particular purpose. An integrated circuit design may include specific aspects describing the ASIC (e.g., the package) in which the design will be placed. The combination of providing a library of integrated circuit design templates and including packaging information in the design templates may result in designs being implemented multiple times for a number of different packages that may be suitable for certain designs. This may result in a library with a quantity and duplication of templates (or portions thereof) which, due to the multiplicity of templates, may be costly or difficult to manage, maintain, and use. Accordingly, there is a need to improve the maintainability of and reduce the size of integrated circuit design template libraries while maintaining flexibility for users to customize designs.

Described herein are techniques for generating an integrated circuit, such as an ASIC or a SoC, in which a design for the integrated circuit is bifurcated between a core design and a shell (which represents an ASIC package in which the core design may be instantiated). The integrated circuit core design and the integrated circuit shell may be expressed in a same hardware description language. The integrated circuit core design may include one or more functions which may be selected by a user to be included in the integrated circuit. The functions may have connection points internal to the integrated circuit (or simply "connection points") for providing inputs and outputs to the functions. These connection points can later be connected to connection points in a shell which may enable respective inputs and outputs to be connected to or otherwise exposed to pads through which signals can be sent or received outside of the ASIC package. An integrated circuit shell may be re-usable for multiple integrated circuit core designs. The integrated circuit shell may have a limited set of pads (or "overlay") to be included in the integrated circuit. The pads may correspond to physical connections implemented on the integrated circuit (providing inputs and outputs to the integrated circuit) and pad circuitry associated with the physical connections. Accordingly, the pads may provide system level I/O for the integrated circuit, such as for interfacing with pins of a package (e.g., via bond wires) which houses the integrated circuit when realized in silicon. A control interface, such as an application program interface (API), may facilitate querying the integrated circuit shell to determine availability of pads to connect to the connection points of the functions. Upon determining availability, the pads may be mapped to the connection points to generate an integrated circuit design in a hardware description language. The integrated circuit design may then proceed to subsequent steps, such as synthesis, placement and routing, implementation of clock trees, simulation analysis, and transmission for manufacturing of the integrated circuit, such as an ASIC that is a SoC.

Specifically, with respect to an ASIC, the shell expresses the I/O circuitry of the ASIC (e.g., pads) and the core design expresses the internal core circuitry functions of the ASIC (e.g., control for DDR memory, PCIe, GPIOs, UART, SPI, PWM, and/or I²C). For example, a register transfer level (RTL) design for an ASIC may be split between a first RTL component comprising I/O circuitry of the ASIC and a second RTL component comprising internal core circuitry functions of the ASIC. The first RTL component and the second RTL component may then be mapped to each other using their respective connection points. In some implementations, the mapping between the first RTL component and the second RTL component may be utilized to generate a combined RTL component including the circuitry of both the core design and the selected shell for that core design. Separating the I/O circuitry of the shell from the core design in this way may permit the shell to include RTL expressions of the finite resources associated with a particular ASIC package which may include, for example, pad circuitry for some or all of the pads of the ASIC package (and which may include, for example, special purpose pads with pad circuitry designed for that special purpose). Some pads may have pad circuitry with connections to one or more connection points which may be connectable to connection points of function (s) of a core design. Other pads might not have any connection points depending on the pad's purpose. For example, pads dedicated to power or other special purpose functions might not have any connection points. The bifurcated structure (e.g., the shell and the core design) is different, for example, than that which would be utilized for a field programmable gate array (FPGA) design which would instead use a single RTL design to program the FPGA. For example, to the extent that a FPGA may include board/system level resources (e.g., board level LEDs, buttons, switches, GPIOs, and the like), a constraints file (e.g., a Xilinx Design Constraints (XDC) file or a Synopsys Design Constraints (SDC) file, not RTL) would be used to map the FPGA board/system level resources to I/O of the FPGA chip. In other words, a FPGA has fixed resources and thus would not utilize separate RTL relating to I/O, such as pads or pad circuitry, and the physical design or silicon of a FPGA will not change responsive to the RTL used to program the FPGA or any constraints file that may be utilized. By contrast, an ASIC shell will include RTL used to instantiate pad circuitry in an associated ASIC package and may affect the size and configuration of the underlying silicon of the ASIC.

In some implementations, the control interface may reference a library of integrated circuit shells in which different integrated circuit shells in the library have different configurations for the limited set of pads. An integrated circuit shell may be selected from the library based on one or more conditions, such as the integrated circuit shell having at least number of available pads mapping to connection points of functions of an integrated circuit core design, or the integrated circuit shell having pads with configurations corresponding to connection points of functions of an integrated circuit core design. In some implementations, the limited set of pads may exist in a global pool of pads that are available for any type of connection point. In some implementations, the limited set of pads may include pads for specific types of connection points, such as connections to power, ground, and/or I/O signaling. In some implementations, the limited set of pads may comprise one or more groups of pads (or "overlays"). A group of pads may be configured to support a specific function in the integrated circuit core design. For example, group of pads may be configured to support DDR memory, PCIe, GPIOs, UART, SPI, PWM, and/or I²C.

FIG. 1 is block diagram of an example of an integrated circuit shell 100. The integrated circuit shell 100 may represent a shell for an ASIC that is selected from a library. The integrated circuit shell 100 may be combined later with an integrated circuit core design to generate a design for an ASIC which may be manufactured in silicon and packaged. The integrated circuit shell 100 may be expressed in a hardware description language. For example, the integrated circuit shell 100 may be an RTL data structure. For example, the integrated circuit shell 100 may be expressed in Verilog.

The integrated circuit shell 100 may express circuitry that describes a limited set of pads 120 (or "overlay") to be included in an integrated circuit, such as pads 130A through 130C. The pads may correspond to physical connections implemented on an ASIC (providing inputs and outputs to the ASIC) and pad circuitry associated with the physical connections. For example, the pads may map to I/O for interfacing with pins of a package (e.g., via bond wires) which houses the ASIC when realized in silicon.

In some implementations, the pads may be associated with pad circuitry for implementing various pad configurations for use by the integrated circuit core design. The pad configurations could include, for example, pads providing power connections, ground connections, I/O signals, and/or pads providing any type of connection in a global pool (e.g., power, ground, or I/O signals). In some implementations, the pad circuitry may implement voltage levels, current draws, and/or signaling type (e.g., open collector, open drain), including based on a given process node. For example, pad 130A may be associated with pad circuitry implementing a first pad configuration, e.g., a power connection to a given voltage level, so that pad 130A provides a power connections to the integrated circuit; pad 130B may be associated with pad circuitry providing a second pad configuration, e.g., a ground connection, so that pad 130B provides a ground connection to the integrated circuit; and pad 130C may be associated with pad circuitry providing a third pad configuration, e.g., an open collector or open drain connection, so that pad 130C provides an I/O signal connection to the integrated circuit. In some implementations, the pad circuitry may be limited to a wire so that the pad could provide any type of connection to the integrated circuit (e.g., power, ground, or I/O signals).

In some implementations, the limited set of pads 120 may include one or more groups of pads (or "overlays"). A group of pads may include a predetermined number of pads, which may include one or more pad configurations, for supporting connection points of a corresponding function, such as DDR memory, PCIe, GPIOs, UART, SPI, PWM, and/or I²C. For example, the limited set of pads 120 may include a PCIe group having a predetermined number of pads with pad configurations for supporting the PCIe function. For example, a group of pads may include a predetermined number of pads providing power connections, a predetermined pads providing ground connections, and/or a predetermined pads providing I/O signal connections, corresponding to the connection points of a given function.

In some implementations, the integrated circuit shell 100 may correspond to a predetermined package for housing the ASIC when realized in silicon. Accordingly, the integrated circuit shell 100 may express limited inputs and outputs (via the limited set of pads 120) which may represent the limited inputs and outputs of the predetermined package (such as the limited pins of the package). This may permit a reduction in the number of possible packages for integrated circuit designs while maintaining flexibility for users to build custom designs.

Figure 6:
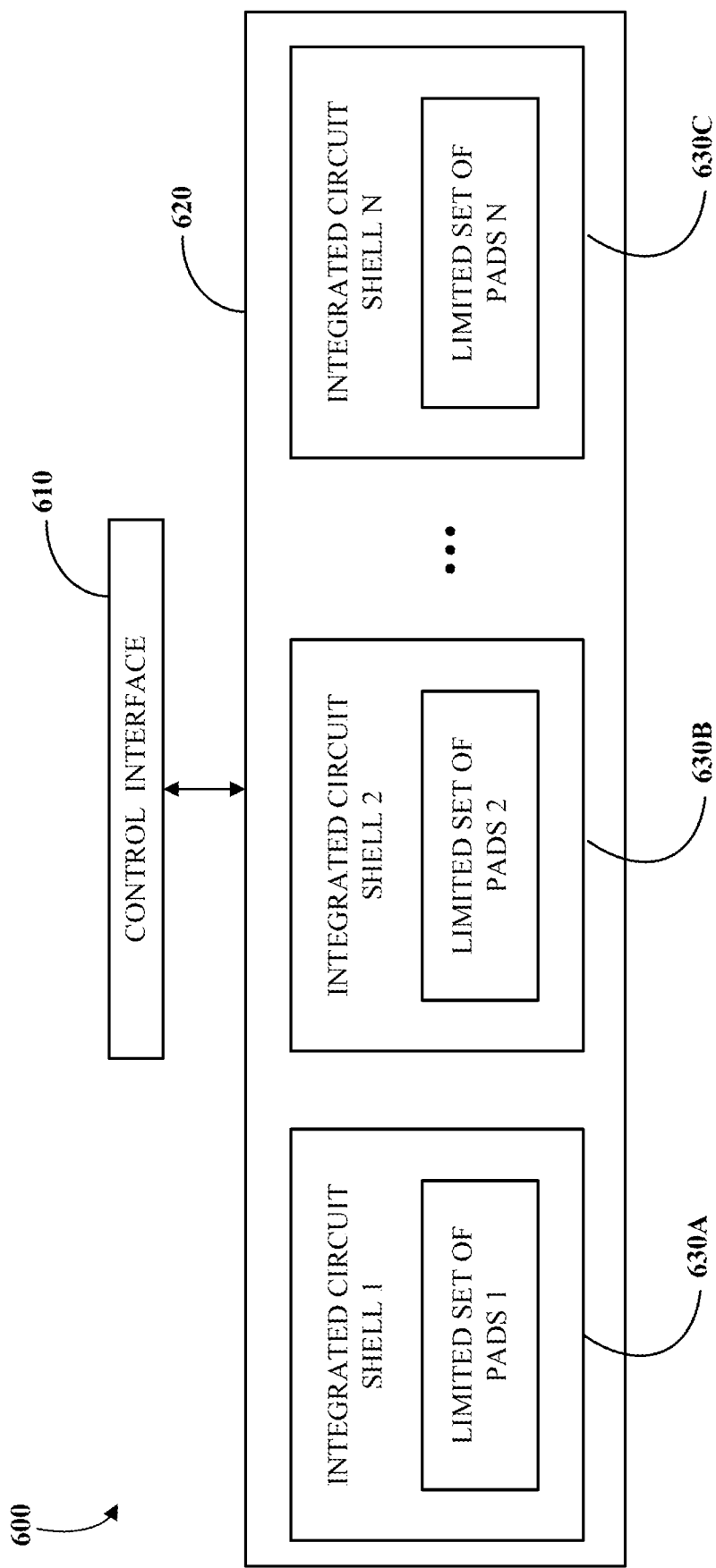
FIG. 6 is block diagram of an example of a system including a library of integrated circuit shells.

The integrated circuit shell 100 may be generated in a design environment. In some implementations, the integrated circuit shell 100 may be selected from a library of integrated circuit shells in which different integrated circuit shells in the library have different configurations for the limited set of pads 120. For example, the integrated circuit shell 100 may be selected from a library as shown in FIG. 6.

Figure 2:
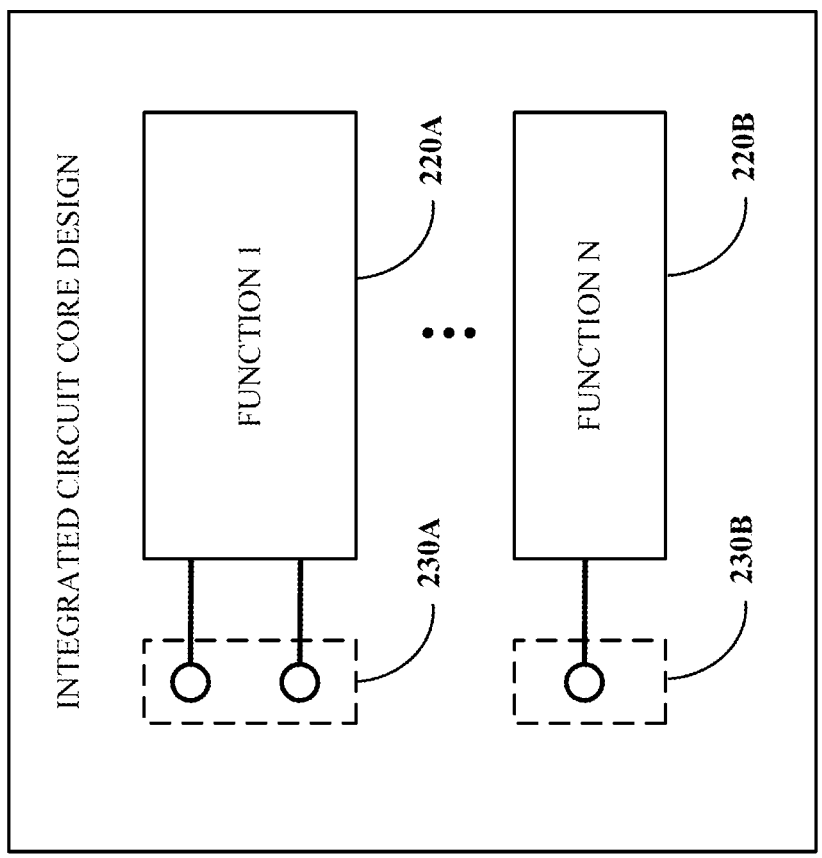
FIG. 2 is block diagram of an example of an integrated circuit core design.

FIG. 2 is block diagram of an example of an integrated circuit core design 200. The integrated circuit core design 200 may be generated in a design environment with an integrated circuit shell, such as the integrated circuit shell 100 shown in FIG. 1. The integrated circuit core design 200 may be expressed in a hardware description language. For example, the integrated circuit core design 200 may be an RTL data structure. For example, the integrated circuit core design 200 may be expressed in Verilog.

Figure 7:
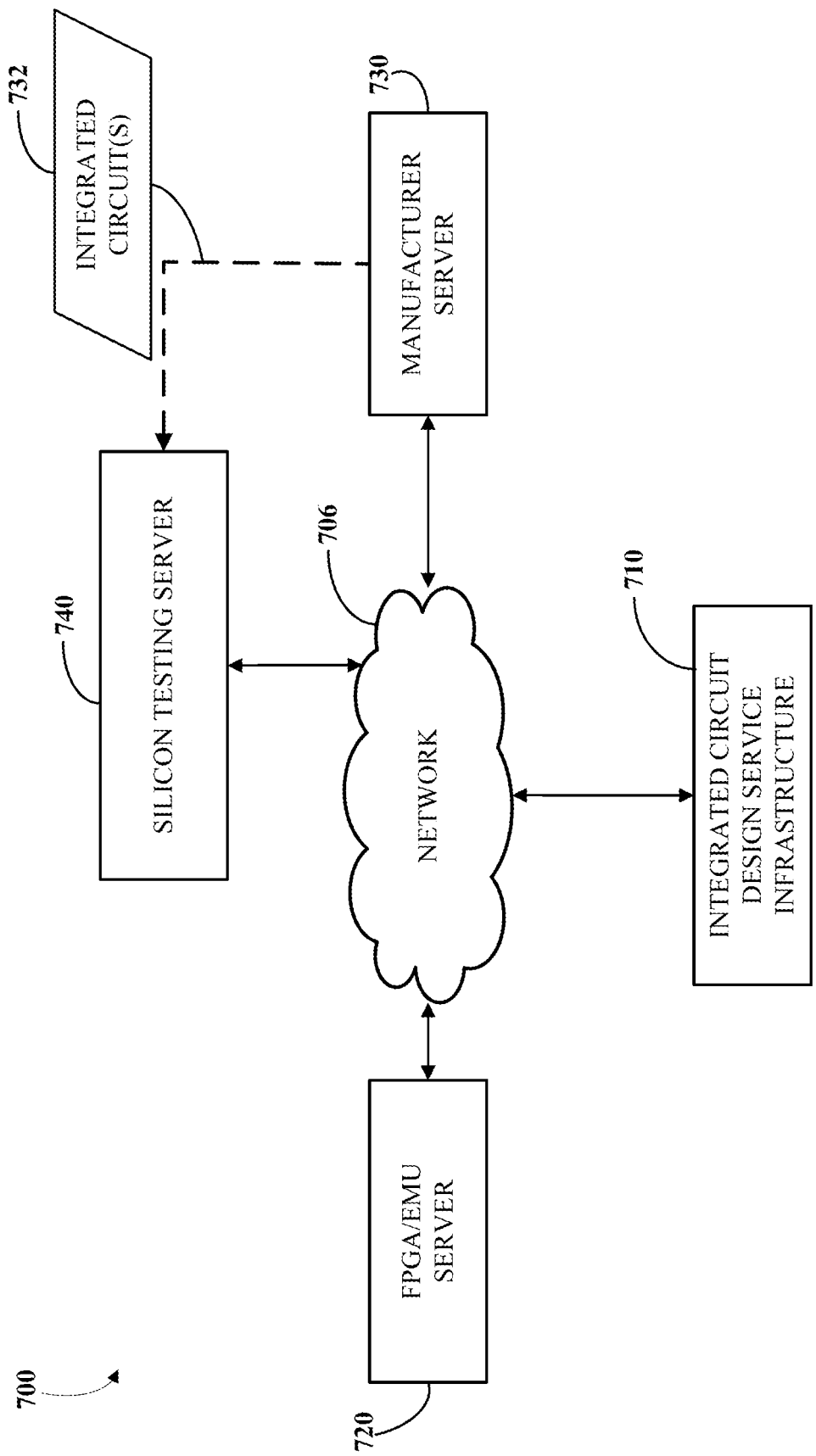
FIG. 7 is block diagram of an example of a system for facilitating generation and manufacture of integrated circuits.

The integrated circuit core design 200 may express circuitry that describes one or more functions to be included in an integrated circuit, such as functions 220A and 220B. The functions may be selected by a user, such as during a design flow in which a user specifies their chip configurations in terms of design parameter values. For example, a user may utilize a web client or a scripting API client to command an integrated circuit design service infrastructure to automatically generate an integrated circuit design based a set of design parameter values selected by the user as shown in FIG. 7. The functions may implement support for various computing architectures which may be included in a SoC, such as DDR memory, PCIe, GPIOs, UART, SPI, PWM, and/or I²C. For example, in one implementation, function 220A could implement PCIe communication, and function 220B could implement a block of GPIOs. Thus, the integrated circuit core design 200 gives flexibility to users to build custom designs.

Functions of the integrated circuit core design 200 may include connection points providing inputs and outputs to the functions, such as connection points 230A and 230B providing inputs and outputs to functions 220A through 220C, respectively. The connection points may represent connections that are internal to the integrated circuit for providing inputs and outputs between the functions and the package. In some implementations, the functions may implement various types of connection points depending on the function, such as a connection point providing power to the function, a connection points providing ground to the function, and/or a connection point providing an I/O signal to the function. For example, function 220A could implement PCIe communication with connection points including power, ground, and I/O signals for supporting the PCIe communication, and function 220B could implement GPIOs with connection points including I/O signals for supporting the GPIOs.

Figure 3:
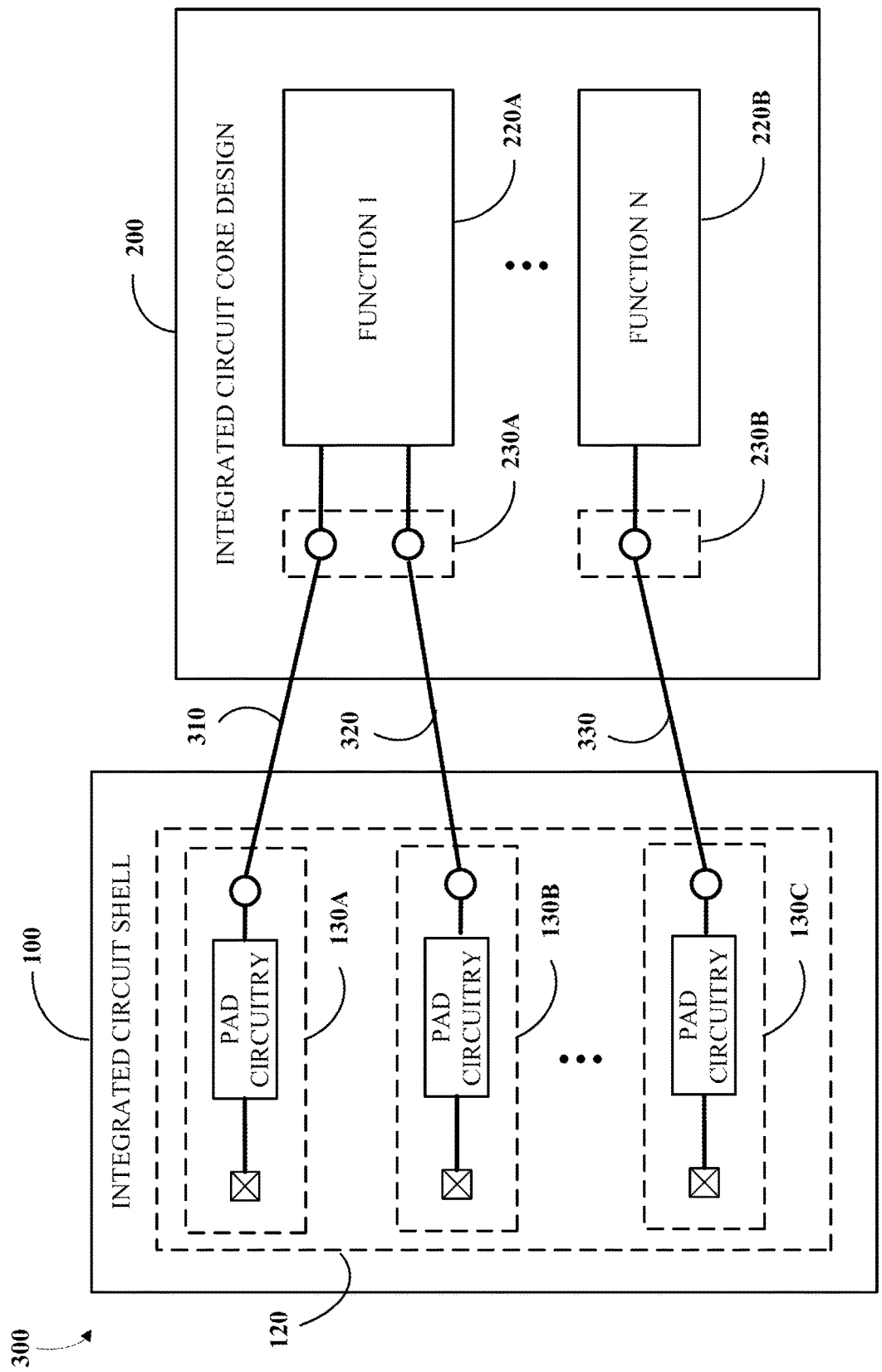
FIG. 3 is block diagram of an example of an integrated circuit core design generated from an integrated circuit shell and an integrated circuit core design.

FIG. 3 is a block diagram of an example of an integrated circuit design 300 generated from the integrated circuit shell 100 and the integrated circuit core design 200. In a design environment, a control interface, such as an API, may query the integrated circuit shell 100 to determine availability of pads of the limited set of pads 120 to connect to the connection points of the functions, such as connection points 230A and 230B of functions 220A through 220C, respectively. In some implementations, as the integrated circuit design is being generated (using the integrated circuit shell 100 and the integrated circuit core design 200), each function may use the control interface to query the integrated circuit shell 100 to determine availability of pads of the limited set of pads 120 to connect to the connection points of the function. In some implementations, determining availability of a pad may include determining availability of pads having pad configurations which correspond to types of connection points for a function. For example, determining availability of a pad may include: determining availability of a pad providing a power connection to the integrated circuit for a connection point providing power to a function, determining availability of a pad providing a ground connection to the integrated circuit for a connection point providing ground to a function; and/or determining availability of a pad providing an I/O signal to the integrated circuit for a connection point providing an I/O signal to the function.

Upon determining availability of pads, the control interface may map available pads of the limited set of pads 120 to the connection points of the functions. For example, the control interface may map a connection 310 from pad 130A to a first connection point of connection points 230A, may map a connection 320 from pad 130B to a second connection point of connection points 230A, and may map a connection 330 from pad 130C to a connection point of connection point 230B. Mapping the connections may include generating and/or updating the integrated circuit design 300 (in which the integrated circuit core design 200 and the integrated circuit shell 100 are connected together) in a hardware description language. The integrated circuit design 300 may then proceed to subsequent steps, such as synthesis, placement and routing, implementation of clock trees, simulation analysis, and transmission for manufacturing of the integrated circuit, such as a SoC.

Figure 8:
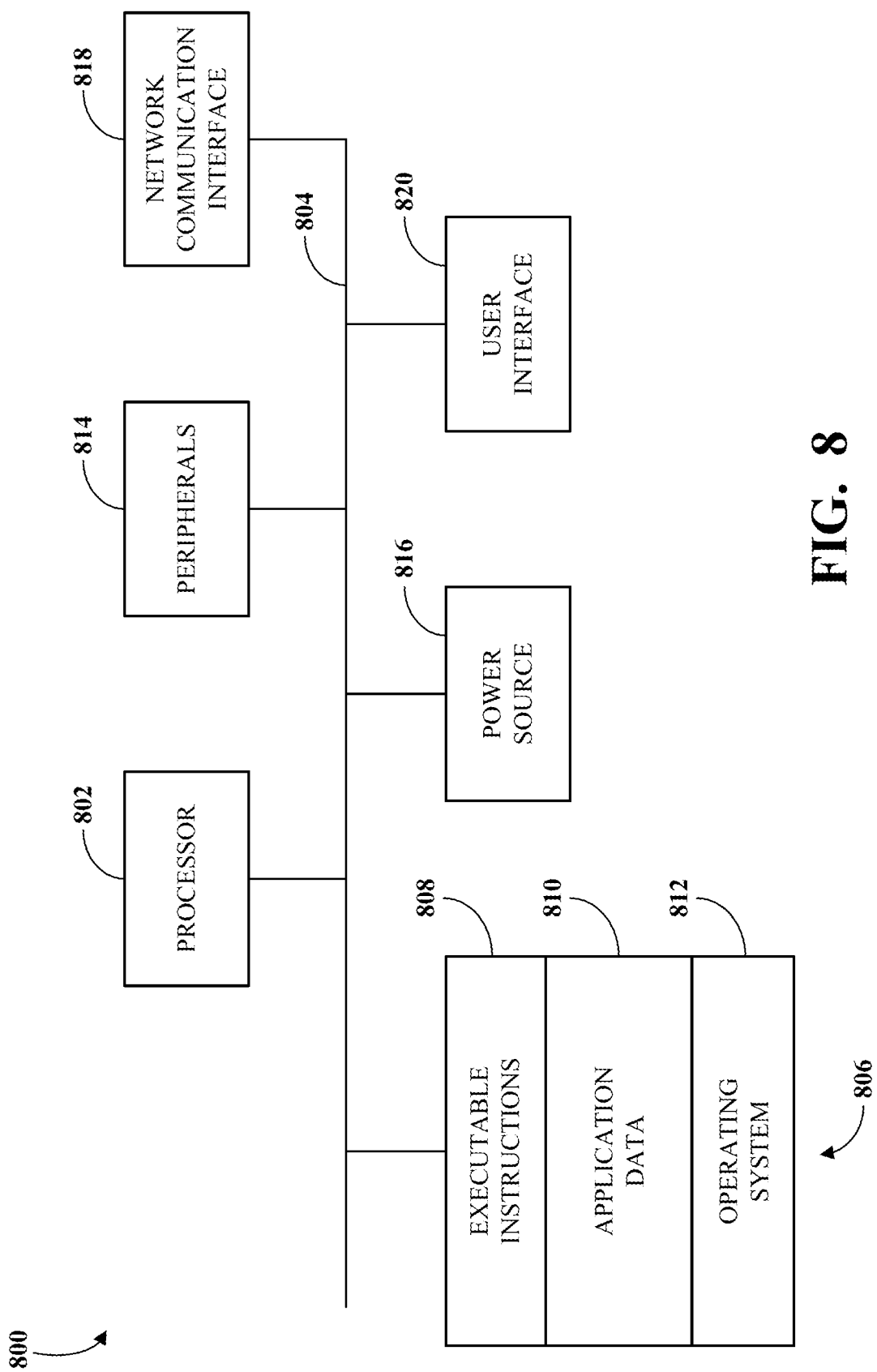
FIG. 8 is block diagram of an example of a system for facilitating generation of integrated circuits.

In some implementations, failing to determine availability of pads to connect to connection points may cause a message to be output to a display, such as to the user interface 820 of FIG. 8. For example, upon querying the integrated circuit shell 100, the control interface may determine that the integrated circuit shell 100 does not have the number of pads available and/or the type of pads available for mapping to functions of the integrated circuit core design 200. This may be resolved in the system, for example, by deletion of one or more functions of the integrated circuit core design 200 and/or by selection of an alternative integrated circuit shell for the integrated circuit shell 100.

In some implementations, one or more pads of the integrated circuit shell 100 may be unused by the integrated circuit core design 110. In other words, in some implementations, the integrated circuit core design 110 may use a subset of the available pads of the integrated circuit shell 100.

Figure 4:
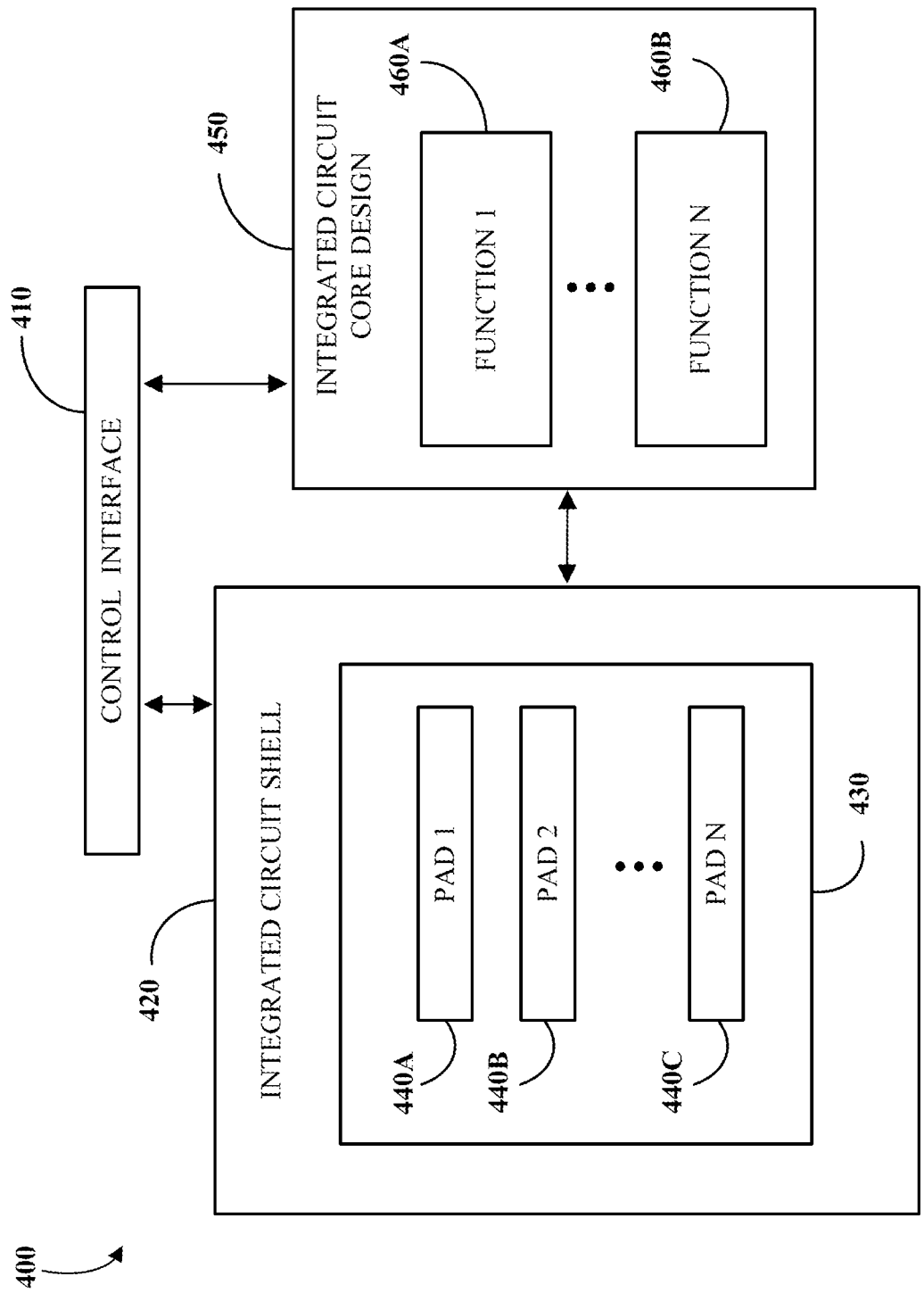
FIG. 4 is block diagram of an example of a system for facilitating generation of an integrated circuit using an integrated shell.

FIG. 4 is block diagram of an example of a system 400 for facilitating generation of an integrated circuit (e.g., an ASIC) using an integrated shell. The system 400 includes a control interface 410, an integrated circuit shell 420, and an integrated circuit core design 450. The integrated circuit shell 420 and the integrated circuit core design 450 may be like the integrated circuit shell 100 shown in FIG. 1 and the integrated circuit core design 200 shown in FIG. 2. The integrated circuit core design 450 may be generated in a design environment based on selections of functions made by a user, such as by using the integrated circuit design service infrastructure shown in FIG. 7. The integrated circuit core design 450 may be generated to include functions, such as DDR memory, PCIe, GPIOs, UART, SPI, PWM, and/or I²C. For example, the integrated circuit core design 450 may be generated to include functions 460A and 460B, such as PCIe and GPIOs, respectively. The functions may include connection points providing inputs and outputs to the functions.

The integrated circuit shell 420 may be generated in the design environment for use with the integrated circuit core design 450. In some implementations, the integrated circuit shell 420 may be selected from a library. For example, the integrated circuit shell 420 may be selected from a library as shown in FIG. 6. The integrated circuit shell 420 may include a limited set of pads 430, like the limited set of pads 120 shown in FIGS. 1 and 2. In some implementations, the limited set of pads 430 may comprise pads in a global pool that are available for any type of connection point (e.g., power, ground, or I/O), such as pads 440A through 440C. The pads may correspond to physical connections implemented on the integrated circuit (e.g., providing inputs and outputs to an ASIC).

The control interface 410, such as an API, may query the integrated circuit shell 420 to determine availability of pads of the limited set of pads 430 to connect to the connection points of the functions, such as the connection points of functions 460A and 460B. In some implementations, as an integrated circuit design is being generated (using the integrated circuit shell 420 and the integrated circuit core design 450), each function may use the control interface 410 to query the integrated circuit shell 420 to determine availability of pads of the limited set of pads 430 to connect to the connection points of the function. In some implementations, determining availability of pads may include determining availability of a number of pads for use with a corresponding number of connection points of the functions. For example, the control interface 410 may query the integrated circuit shell 420 to determine availability of pads to connect to the connection points of the functions 460A and 460B implementing PCIe and GPIOs, respectively. Upon determining availability of pads, the control interface may map the available pads of the limited set of pads 430 to the connection points of the functions. The mapping may produce an integrated circuit design that is a composite of the integrated circuit shell 420 and the integrated circuit core design 450.

In some implementations, the control interface may fail to determine availability of pads to connect to the connection points of the functions. For example, the control interface may determine that the integrated circuit shell 420 does not have a number of pads available and/or type of pads available for mapping to functions 460A and 460B. In this case, an alternative integrated circuit shell may be selected, and/or one or more functions of the integrated circuit core design 450 may be modified or deleted. The process of determining availability of pads of the integrated circuit shell 420 and mapping available pads to the connection points of the functions may repeat one or more times until an integrated circuit shell 420 that supports the integrated circuit core design 450 is resolved.

In some implementations, one or more pads of the integrated circuit shell 420 may be unused by the integrated circuit core design 450. In other words, in some implementations, the integrated circuit core design 450 may use a subset of the available pads of the integrated circuit shell 420.

Figure 5:
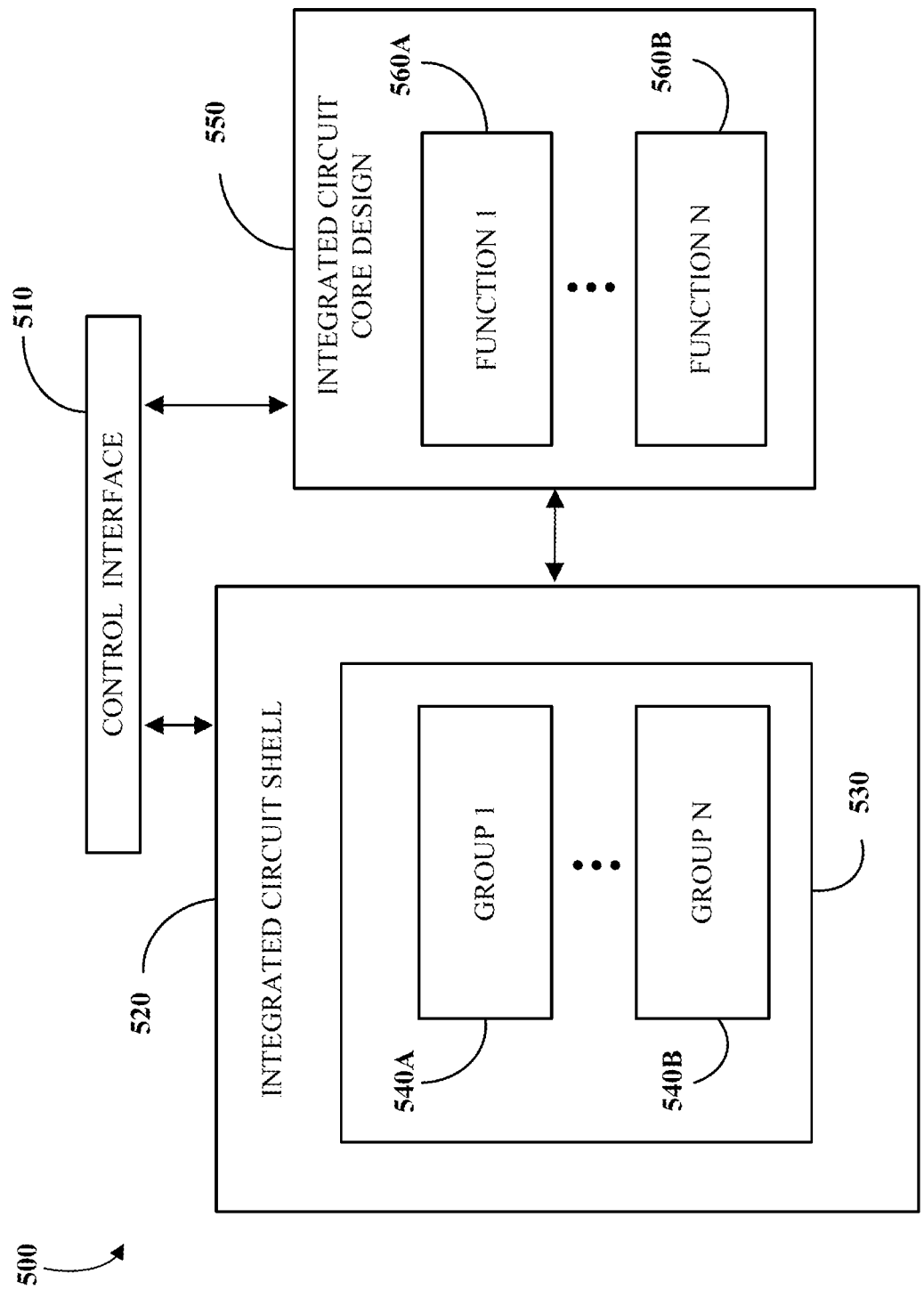
FIG. 5 is block diagram of another example of a system facilitating generation of an integrated circuit using an integrated circuit shell.

FIG. 5 is block diagram of another example of a system 500 for facilitating generation of an integrated circuit (e.g., an ASIC) using an integrated circuit shell. The system 500 includes a control interface 510, an integrated circuit shell 520, and an integrated circuit core design 550. The integrated circuit shell 520 and the integrated circuit core design 550 may be like the integrated circuit shell 100 shown in FIG. 1 and the integrated circuit core design 200 shown in FIG. 2. The integrated circuit core design 550 may be generated in a design environment based on selections of functions made by a user, such as by using the integrated circuit design service infrastructure shown in FIG. 7. The integrated circuit core design 550 may be generated to include functions, such as DDR memory, PCIe, GPIOs, UART, SPI, PWM, and/or I$^2$C. For example, the integrated circuit core design 550 may be generated to include functions 560A and 560B, such as PCIe and GPIOs, respectively. The functions may include connection points providing inputs and outputs to the functions.

The integrated circuit shell 520 may be generated in the design environment for use with the integrated circuit core design 550. In some implementations, the integrated circuit shell 520 may be selected from a library. For example, the integrated circuit shell 520 may be selected from a library as shown in FIG. 6. The integrated circuit shell 420 may include a limited set of pads 530, like the limited set of pads 120 shown in FIGS. 1 and 2. In some implementations, the limited set of pads 530 may comprise pads for supporting specific types of connection points, such as connections to power, ground, and/or I/O signaling. The pads may provide inputs and outputs to the integrated circuit. In some implementations, the limited set of pads 530 may be arranged in groups of pads configured to support specific functions which may be implemented in an integrated circuit core design, such as DDR memory, PCIe, GPIOs, UART, SPI, PWM, and/or I$^2$C. For example, the limited set of pads 530 may be arranged in a first group of pads 540A configured to support PCIe and a second group of pads 540B configured to support GPIOs.

The control interface 510, such as an API, may query the integrated circuit shell 520 to determine availability of pads of the limited set of pads 530 to connect to the connection points of the functions, such as the connection points of functions 560A and 560B. In some implementations, as an integrated circuit design is being generated (using the integrated circuit shell 520 and the integrated circuit core design 550), each function may use the control interface 510 to query the integrated circuit shell 520 to determine availability of pads of the limited set of pads 530 to connect to the connection points of the function. In some implementations, determining availability of pads may include determining availability of pads for supporting specific types of connection points, such as connections to power, ground, and/or I/O signaling. In some implementations, determining availability of pads may include determining availability of a group of pads configured for use with a corresponding function implemented by the integrated circuit core design 550. For example, the control interface 510 may query the integrated circuit shell 520 to determine availability of a group of pads to connect to the connection points of function 560A implementing PCIe, such as the first group of pads 540A configured to support PCIe, and to determine availability of a group of pads to connect to the connection points of function 560B implementing GPIOs, such as the second group of pads 540B configured to support GPIOs. Upon determining availability of groups of pads, the control interface may map pads of the available groups to connection points of corresponding functions. The mapping may produce an integrated circuit design that is a composite of the integrated circuit shell 520 and the integrated circuit core design 550.

In some implementations, the control interface may fail to determine availability of a group of pads to connect to the connection points of the functions. For example, the control interface may determine that the integrated circuit shell 520 does not have a group of pads available and/or type of pads available for mapping to functions 560A and 560B. In this case, an alternative integrated circuit shell may be selected, and/or one or more functions of the integrated circuit core design 550 may be modified or deleted. The process of determining availability of pads of the integrated circuit shell 520 and mapping available pads to the connection points of the functions may repeat one or more times until an integrated circuit shell 520 that supports the integrated circuit core design 550 is resolved.

In some implementations, one or more groups of pads of the integrated circuit shell 520 may be unused by the integrated circuit core design 550. In other words, in some implementations, the integrated circuit core design 550 may use a subset of the available groups of pads of the integrated circuit shell 520.

FIG. 6 is block diagram of an example of a system 600 including a library of integrated circuit shells. The system 600 may include a control interface 610 and a library 620 of integrated circuit shells, such as integrated circuit shell 630A through 630C. The integrated circuit shells may be like the integrated circuit shell 100 shown in FIGS. 1 and 3. In some implementations, the integrated circuit shells in the library 620 may correspond to different packages for housing an ASIC when realized in silicon.

In some implementations, the integrated circuit shells in the library 620 may have differences in their respective limited sets of pads. In one example, integrated circuit shell 630A could have a first number of pads, integrated circuit shell 630B could have a second number of pads that is greater than the first number of pads, and integrated circuit shell 630C could have a third number of pads that is greater than the second number of pads. In another example, integrated circuit shell 630A could have groups of pads supporting a first set of functions (e.g., PCIe and GPIOs), integrated circuit shell 630B could have groups of pads supporting a second set of functions (e.g., PCIe, GPIOs, UART, and SPI), and integrated circuit shell 630C could have groups of pads supporting a third set of functions (e.g., PCIe, GPIOs, PWM, and $I^2C$). In some implementations, the integrated circuit shells in the library 620 may have differences in their respective limited sets of pads which permit mapping to different process nodes. For example, integrated circuit shell 630A could have pads which permit mapping to a first process node, such as 7 nanometer technology, integrated circuit shell 630B could have pads which permit mapping to a second process node, such as 5 nanometer technology, and so forth.

In some implementations, the control interface 610 may reference the library 620 to automatically select an integrated circuit shell for use with an integrated circuit core design, such as the integrated circuit core design 200 shown in FIGS. 2 and 3. The control interface 610 may select the integrated circuit shell from the library 620 based on one or more conditions, such as the integrated circuit shell having a least number of available pads mapping to connection points of functions of an integrated circuit core design, and/or the integrated circuit shell having groups of pads corresponding to connection points of functions of an integrated circuit core design. Upon selection of an integrated circuit shell from the library 620, the control interface 610 may generate the integrated circuit shell in a design environment for use with an integrated circuit core design.

FIG. 7 is block diagram of an example of a system 700 for generation and manufacture of integrated circuits, including based on a bifurcation between an integrated circuit core design and an integrated circuit shell. The system 700 includes a network 706, an integrated circuit design service infrastructure 710, a field programmable gate array (FPGA)/emulator server 720, and a manufacturer server 730. For example, a user may utilize a web client or a scripting API client to command the integrated circuit design service infrastructure 710 to automatically generate an integrated circuit design based a set of design parameter values selected by the user for one or more template integrated circuit designs. In some implementations, the integrated circuit design service infrastructure 710 may be configured to generate an integrated circuit design like the integrated circuit design 300 shown in FIG. 3.

The integrated circuit design service infrastructure 710 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 710 may invoke (e.g., via network communications over the network 706) testing of the resulting design that is performed by the FPGA/emulation server 720 that is running one or more FPGAs or other types of hardware or software emulators. For example, the integrated circuit design service infrastructure 710 may invoke a test using a field programmable gate array, programmed based on a field programmable gate array emulation data structure, to obtain an emulation result. The field programmable gate array may be operating on the FPGA/emulation server 720, which may be a cloud server. Test results may be returned by the FPGA/emulation server 720 to the integrated circuit design service infrastructure 710 and relayed in a useful format to the user (e.g., via a web client or a scripting API client).

The integrated circuit design service infrastructure 710 may also facilitate the manufacture of integrated circuits using the integrated circuit design in a manufacturing facility associated with the manufacturer server 730. In some implementations, a physical design specification (e.g., a graphic data system (GDS) file, such as a GDS II file) based on a physical design data structure for the integrated circuit is transmitted to the manufacturer server 730 to invoke manufacturing of the integrated circuit (e.g., using manufacturing equipment of the associated manufacturer). For example, the manufacturer server 730 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 710 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 710 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 730 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 732, update the integrated circuit design service infrastructure 710 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 710 on the status of the packaging and delivery process periodically or asynchronously. In some implementations, status updates may be relayed to the user when the user checks in using the web interface and/or the controller might email the user that updates are available.

In some implementations, the resulting integrated circuits 732 (e.g., physical chips) are delivered (e.g., via mail) to a silicon testing service provider associated with a silicon testing server 740. In some implementations, the resulting integrated circuits 732 (e.g., physical chips) are installed in a system controlled by silicon testing server 740 (e.g., a cloud server) making them quickly accessible to be run and tested remotely using network communications to control the operation of the integrated circuits 732. For example, a login to the silicon testing server 740 controlling a manufactured integrated circuits 732 may be sent to the integrated circuit design service infrastructure 710 and relayed to a user (e.g., via a web client). For example, the integrated circuit design service infrastructure 710 to control testing of one or more integrated circuits 732, which may be structured based on an RTL data structure determined using the process 900 of FIG. 9 and/or the process 1000 of FIG. 10.

FIG. 8 is block diagram of an example of a system 800 for facilitating generation of an of integrated circuits, including based on a bifurcation between an integrated circuit core design and an integrated circuit shell, for facilitating generation of a circuit representation for an integrated circuit, and/or for programming or manufacturing an integrated circuit. The system 800 is an example of an internal configuration of a computing device. The system 800 may be used to implement the integrated circuit design service infrastructure 710, and/or to generate a file that generates a circuit representation of an integrated circuit design like the integrated circuit design 300 shown in FIG. 3. The system 800 can include components or units, such as a processor 802, a bus 804, a memory 806, peripherals 814, a power source 816, a network communication interface 818, a user interface 820, other suitable components, or a combination thereof.

The processor 802 can be a central processing unit (CPU), such as a microprocessor, and can include single or multiple processors having single or multiple processing cores. Alternatively, the processor 802 can include another type of device, or multiple devices, now existing or hereafter developed, capable of manipulating or processing information. For example, the processor 802 can include multiple processors interconnected in any manner, including hardwired or networked, including wirelessly networked. In some implementations, the operations of the processor 802 can be distributed across multiple physical devices or units that can be coupled directly or across a local area or other suitable type of network. In some implementations, the processor 802 can include a cache, or cache memory, for local storage of operating data or instructions.

The memory 806 can include volatile memory, non-volatile memory, or a combination thereof. For example, the memory 806 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 806 can include another type of device, or multiple devices, now existing or hereafter developed, capable of storing data or instructions for processing by the processor 802. The processor 802 can access or manipulate data in the memory 806 via the bus 804. Although shown as a single block in FIG. 8, the memory 806 can be implemented as multiple units. For example, a system 800 can include volatile memory, such as RAM, and persistent memory, such as a hard drive or other storage.

The memory 806 can include executable instructions 808, data, such as application data 810, an operating system 812, or a combination thereof, for immediate access by the processor 802. The executable instructions 808 can include, for example, one or more application programs, which can be loaded or copied, in whole or in part, from non-volatile memory to volatile memory to be executed by the processor 802. The executable instructions 808 can be organized into programmable modules or algorithms, functional programs, codes, code segments, or combinations thereof to perform various functions described herein. For example, the executable instructions 808 can include instructions executable by the processor 802 to cause the system 800 to automatically, in response to a command, generate an integrated circuit design and associated test results based on a design parameters data structure. The application data 810 can include, for example, user files, database catalogs or dictionaries, configuration information or functional programs, such as a web browser, a web server, a database server, or a combination thereof. The operating system 812 can be, for example, Microsoft Windows®, macOS®, or Linux®; an operating system for a small device, such as a smartphone or tablet device; or an operating system for a large device, such as a mainframe computer. The memory 806 can comprise one or more devices and can utilize one or more types of storage, such as solid state or magnetic storage.

The peripherals 814 can be coupled to the processor 802 via the bus 804. The peripherals 814 can be sensors or detectors, or devices containing any number of sensors or detectors, which can monitor the system 800 itself or the environment around the system 800. For example, a system 800 can contain a temperature sensor for measuring temperatures of components of the system 800, such as the processor 802. Other sensors or detectors can be used with the system 800, as can be contemplated. In some implementations, the power source 816 can be a battery, and the system 800 can operate independently of an external power distribution system. Any of the components of the system 800, such as the peripherals 814 or the power source 816, can communicate with the processor 802 via the bus 804.

The network communication interface 818 can also be coupled to the processor 802 via the bus 804. In some implementations, the network communication interface 818 can comprise one or more transceivers. The network communication interface 818 can, for example, provide a connection or link to a network, such as the network 706 shown in FIG. 7, via a network interface, which can be a wired network interface, such as Ethernet, or a wireless network interface. For example, the system 800 can communicate with other devices via the network communication interface 818 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 820 can include a display; a positional input device, such as a mouse, touchpad, touchscreen, or the like; a keyboard; or other suitable human or machine interface devices. The user interface 820 can be coupled to the processor 802 via the bus 804. Other interface devices that permit a user to program or otherwise use the system 800 can be provided in addition to or as an alternative to a display. In some implementations, the user interface 820 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 814. The operations of the processor 802 can be distributed across multiple clients or servers, which can be coupled directly or across a local area or other suitable type of network. The memory 806 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 9:
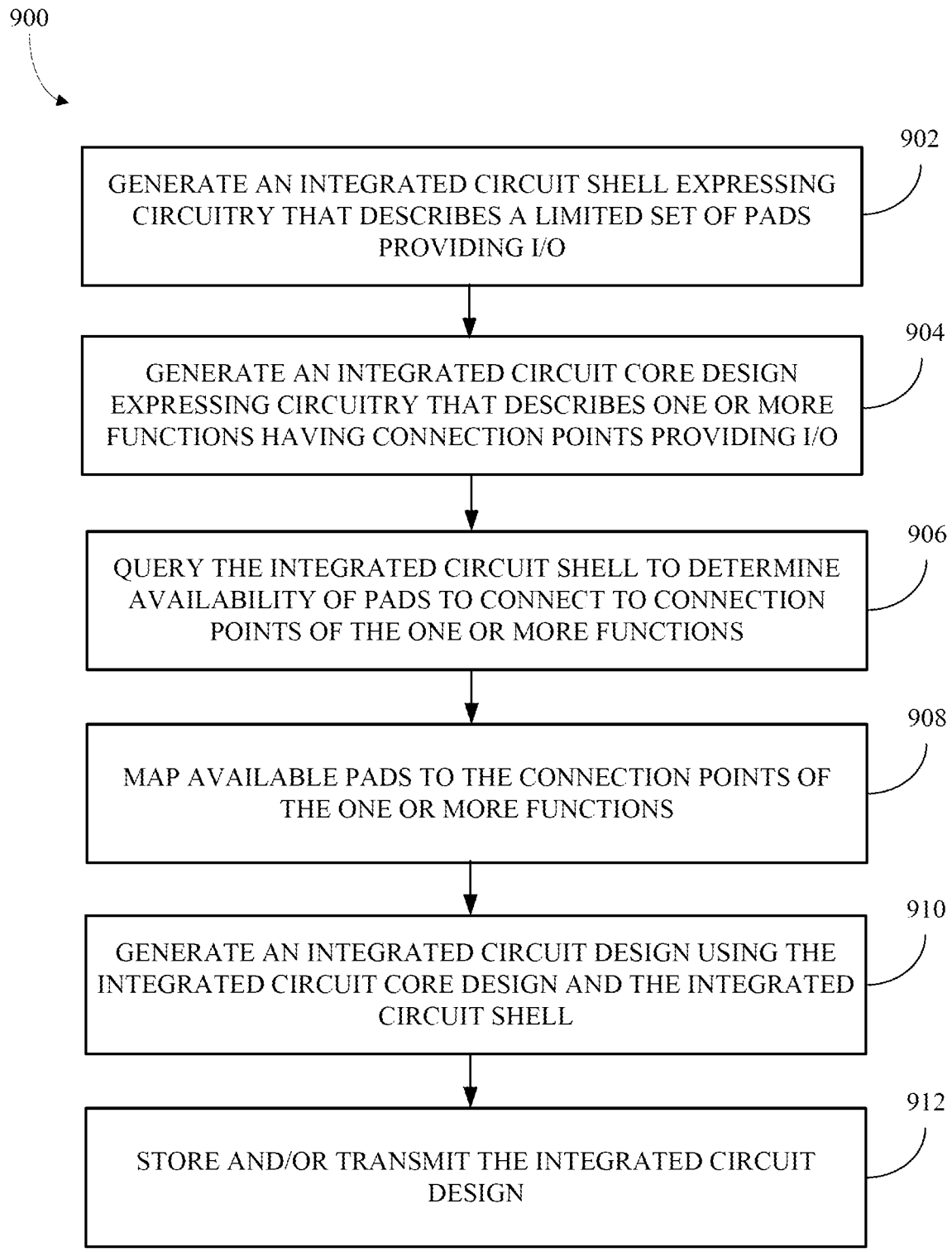
FIG. 9 is flow chart of an example of a process for facilitating generation of an integrated circuit using an integrated circuit shell.

FIG. 9 is flow chart of an example of a process 900 for facilitating generation of an integrated circuit using an integrated circuit shell. The process 900 includes generating 902 an integrated circuit shell; generating 904 an integrated circuit core design; querying 906 the integrated circuit shell; mapping 908 available pads of the integrated circuit shell to the integrated circuit core design; generating 910 an integrated circuit design using the integrated circuit shell and the integrated circuit core design; and storing and/or transmitting 912 the integrated circuit design. For example, the process 900 may be implemented using the integrated circuit shell 100 shown in FIG. 1, the integrated circuit core design 200 shown in FIG. 2, the integrated circuit design 300 shown in FIG. 3, the system 400 shown in FIG. 4, and/or the system 500 shown in FIG. 5.

The process 900 may include generating 902 an integrated circuit shell expressed in a hardware description language. The integrated circuit shell may be generated in a design environment. The integrated circuit shell may express circuitry that describes a limited set of pads to be included in an integrated circuit. The limited set of pads may provide inputs and outputs to the integrated circuit, such as for interfacing with pins of a package which houses the ASIC when realized in silicon. In some implementations, the pads may be associated with pad circuitry for implementing various pad configurations. Pad configurations could include, for example, pads providing power connections to the integrated circuit, pads providing ground connections to the integrated circuit, and/or pads providing I/O signals to the integrated circuit. In some implementations, the limited set of pads 120 may include one or more groups of pads. A group of pads may include a predetermined number of pads having one or more pad configurations for supporting connection points of a corresponding function, such as DDR memory, PCIe, GPIOs, UART, SPI, PWM, and/or I²C. In some implementations, the integrated circuit shell may correspond to a predetermined package for housing the ASIC when realized in silicon.

The process 900 may also include generating 904 an integrated circuit core design expressed in a hardware description language. The integrated circuit core design may be generated in the design environment with the integrated circuit shell. In some implementations, the integrated circuit core design may be instantiated in the integrated circuit shell. The integrated circuit core design may express circuitry that describes functions to be included in the integrated circuit. The functions may be selected by a user, such as during a design flow in which a user specifies their chip configurations in terms of design parameter values. The functions may have connection points providing inputs and outputs to the functions. The functions may implement support for various computing architectures which may be included in the integrated circuit, such as DDR memory, PCIe, GPIOs, UART, SPI, PWM, and/or I²C. The functions may include connection points providing inputs and outputs to the functions. The connection points may represent connections that are internal to the integrated circuit for providing inputs and outputs between the functions and the predetermined package. In some implementations, the functions may implement various types of connection points depending on the function, such as a connection point providing power to the function, a connection points providing ground to the function, and/or a connection point providing an I/O signal to the function.

The process 900 may also include querying 906 the integrated circuit shell to determine availability of pads to connect to the connection points of the functions. In the design environment, a control interface, such as an API, may query the integrated circuit shell to determine availability of pads of the limited set of pads to connect to the connection points of the functions. In some implementations, as the integrated circuit design is being generated, each function may use the control interface to query the integrated circuit shell to determine availability of pads of the limited set of pads to connect to the connection points of the function. In some implementations, determining availability of pads may include determining availability of pads having pad configurations which correspond connection points for a function, such as pads providing power connections to the integrated circuit, pads providing a ground connections to the integrated circuit, and/or pads providing I/O signals to the integrated circuit. In some implementations, failing to determine availability of pads to connect to connection points may cause a message to be output to a display. This may permit a change to be made, such as deletion of one or more functions of the integrated circuit core design and/or generation of an alternative integrated circuit shell.

The process 900 may also include mapping 908 available pads of the integrated circuit shell to the connection points of the functions of the integrated circuit core design. The control interface, such as the API, may map the available pads to the connection points of the functions.

The process 900 may also include generating 910 an integrated circuit design expressed in a hardware description language. The integrated circuit design may be generated in the design environment. The integrated circuit design may be generated using the integrated circuit shell and the integrated circuit core design. The integrated circuit design may include connections, based on the mapping, between the available pads of the integrated circuit shell and the connection points of the functions of the integrated circuit core design.

The process 900 may also include storing and/or transmitting 912 the integrated circuit design. The integrated circuit design may be stored for use in subsequent steps, such as synthesis, placement and routing, implementation of clock trees, and/or simulation analysis. Additionally, the integrated circuit design may be transmitted for manufacturing of an integrated circuit, such as a SoC. The manufactured integrated circuit (e.g., SoC) may be configured in a package corresponding to the integrated circuit shell.

Figure 10:
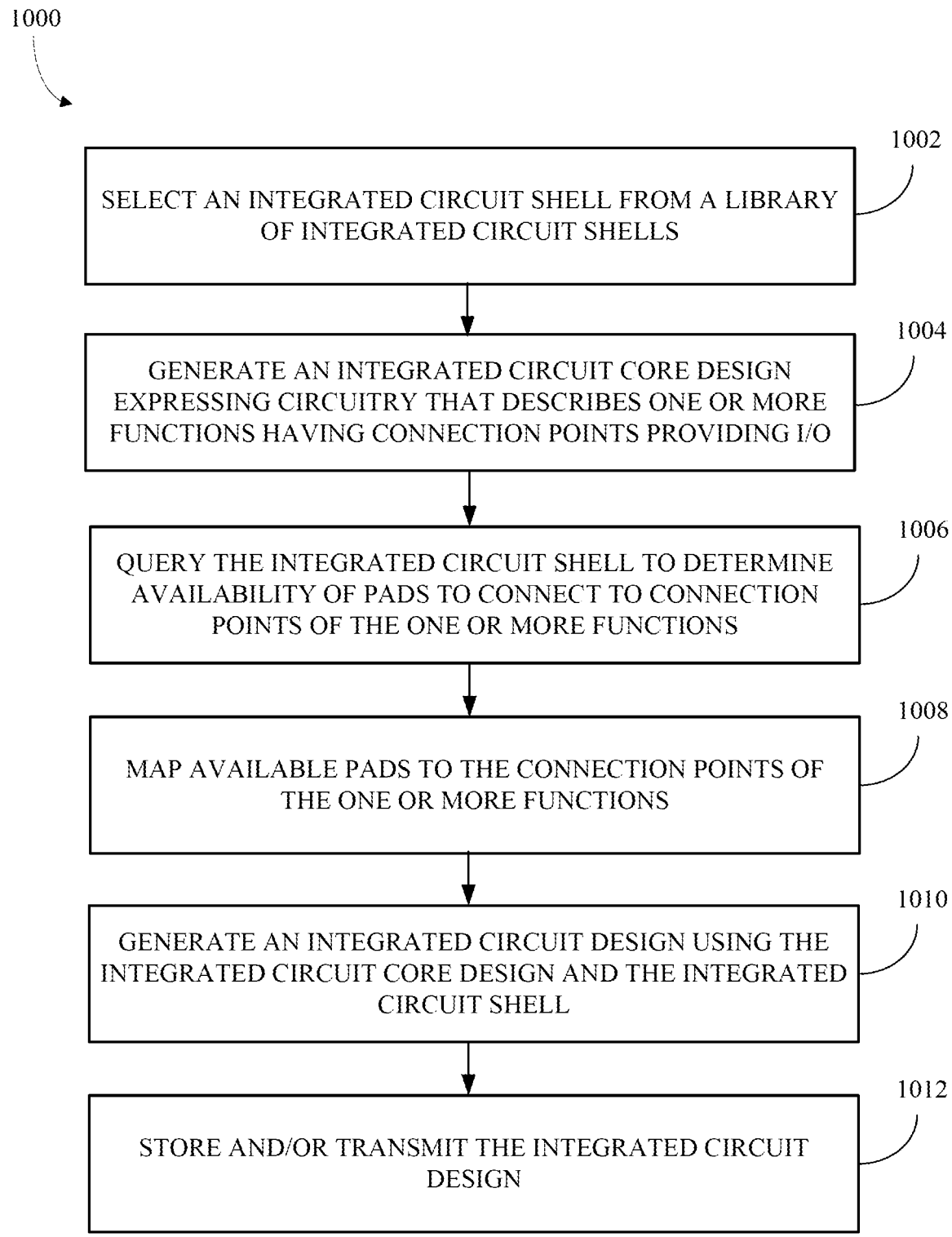
FIG. 10 is flow chart of another example of a process for facilitating generation of an integrated circuit using an integrated circuit shell.

FIG. 10 is flow chart of another example of a process 1000 for facilitating generation of an integrated circuit using an integrated circuit shell. The process 1000 includes selecting 1002 an integrated circuit shell from a library; generating 1004 an integrated circuit core design; querying 1006 the integrated circuit shell; mapping 1008 available pads of the integrated circuit shell to the integrated circuit core design; generating 1010 an integrated circuit design using the integrated circuit shell and the integrated circuit core design; and storing and/or transmitting 1012 the integrated circuit design. For example, the process 1000 may be implemented using the integrated circuit shell 100 shown in FIG. 1, the integrated circuit core design 200 shown in FIG. 2, the integrated circuit design 300 shown in FIG. 3, the system 400 shown in FIG. 4, the system 500 shown in FIG. 5; and/or the system 600 shown in FIG. 6.

The process 1000 may include selecting 1002 an integrated circuit shell for use with an integrated circuit core design. The integrated circuit shell may express circuitry that describes a limited set of pads to be included in an integrated circuit. The limited set of pads may provide inputs and outputs to the integrated circuit, such as for interfacing with pins of a package which houses the ASIC when realized in silicon. A control interface, such as an API, may select the integrated circuit shell from a library. The selection may be based on one or more conditions, such as the integrated circuit shell having at least number of available pads mapping to connection points of functions of an integrated circuit core design, or the integrated circuit shell having pads with configurations corresponding to connection points of functions of an integrated circuit core design. The integrated circuit shells in the library may correspond to different packages for housing an ASIC when realized in silicon. In some implementations, the integrated circuit shells in the library may have differences in their limited sets of pads, such as with respect to the number of pads, types of pads, the number of groups of pads, and/or types of groups of pads. The control interface may reference the library to select an integrated circuit shell for use with an integrated circuit core design. Upon selection of an integrated circuit shell from the library, the control interface may generate the integrated circuit shell in a design environment for use with an integrated circuit core design.

The process 1000 may also include generating 1004 an integrated circuit core design expressed in a hardware description language. The integrated circuit core design may be generated in the design environment with the integrated circuit shell. In some implementations, the integrated circuit core design may be instantiated in the integrated circuit shell. The integrated circuit core design may express circuitry that describes functions to be included in the integrated circuit. The functions may be selected by a user, such as during a design flow in which a user specifies their chip configurations in terms of design parameter values. The functions may have connection points providing inputs and outputs to the functions. The functions may implement support for various computing architectures which may be included in the integrated circuit, such as DDR memory, PCIe, GPIOs, UART, SPI, PWM, and/or I²C. The functions may include connection points providing inputs and outputs to the functions. The connection points may represent connections that are internal to the integrated circuit for providing inputs and outputs between the functions and the predetermined package. In some implementations, the functions may implement various types of connection points depending on the function, such as a connection point providing power to the function, a connection points providing ground to the function, and/or a connection point providing an I/O signal to the function.

The process 1000 may also include querying 1006 the integrated circuit shell to determine availability of pads to connect to the connection points of the functions. In the design environment, a control interface, such as an API, may query the integrated circuit shell to determine availability of pads of the limited set of pads to connect to the connection points of the functions. In some implementations, as the integrated circuit design is being generated, each function may use the control interface to query the integrated circuit shell to determine availability of pads of the limited set of pads to connect to the connection points of the function. In some implementations, determining availability of pads may include determining availability of pads having pad configurations which correspond connection points for a function, such as pads providing power connections to the integrated circuit, pads providing a ground connections to the integrated circuit, and/or pads providing I/O signals to the integrated circuit. In some implementations, failing to determine availability of pads to connect to connection points may cause a message to be output to a display. This may permit a change to be made, such as deletion of one or more functions of the integrated circuit core design and/or selection of an alternative integrated circuit shell from the library.

The process 1000 may also include mapping 1008 available pads of the integrated circuit shell to the connection points of the functions of the integrated circuit core design. The control interface, such as the API, may map the available pads to the connection points of the functions.

The process 1000 may also include generating 1010 an integrated circuit design expressed in a hardware description language, like the integrated circuit design 300 shown in FIG. 3. The integrated circuit design may be generated in the design environment. The integrated circuit design may be generated using the integrated circuit shell and the integrated circuit core design. The integrated circuit design may include connections, based on the mapping, between the available pads of the integrated circuit shell and the connection points of the functions of the integrated circuit core design.

The process 1000 may also include storing and/or transmitting 1012 the integrated circuit design. The integrated circuit design may be stored for use in subsequent steps, such as synthesis, placement and routing, implementation of clock trees, and/or simulation analysis. Additionally, the integrated circuit design may be transmitted for manufacturing of an integrated circuit, such as a SoC. The manufactured integrated circuit (e.g., SoC) may be configured in a package corresponding to the integrated circuit shell.

In a first aspect, the subject matter described in this specification can be embodied in a method that includes: generating an integrated circuit core design expressed in a hardware description language, the integrated circuit core design expressing circuitry that describes one or more functions to be included in an ASIC, wherein the one or more functions have connection points providing first inputs and outputs to the one or more functions; and querying an integrated circuit shell expressed in a hardware description language, the integrated circuit shell expressing circuitry that describes a limited set of pads to be implemented in the ASIC, the limited set of pads providing second inputs and outputs to the ASIC, wherein the querying determines availability of pads of the limited set of pads to connect to the connection points of the one or more functions. In some implementations, the method may include mapping available pads of the limited set of pads to the connection points of the one or more functions. In some implementations, the method may include generating an integrated circuit design expressed in a hardware description language using the integrated circuit core design and the integrated circuit shell, wherein the integrated circuit design corresponds to a system on a chip. In some implementations, the method may include generating the integrated circuit shell. In some implementations, the method may include selecting the integrated circuit shell from a plurality of integrated circuit shells, wherein integrated circuit shells of the plurality of integrated circuit shells have different configurations for the limited set of pads. In some implementations, the method may include selecting the integrated circuit shell from a plurality of integrated circuit shells based on the integrated circuit shell having available pads mapping to the connection points of the one or more functions. In some implementations, the limited set of pads comprises one or more groups of pads, and the querying determines availability of a group of pads for connecting to the connection points of a function of the one or more functions. In some implementations, querying the integrated circuit shell comprises executing an application program interface to determine the availability of pads. In some implementations, the one or more functions may be selected from a group including DDR memory, PCIe, GPIOs, UART, SPI, PWM, and/or I²C.

In a second aspect, the subject matter described in this specification can be embodied in a system that includes a network interface; a memory; and a processor, wherein the memory includes instructions executable by the processor to cause the system to: generate an integrated circuit core design expressed in a hardware description language, the integrated circuit core design expressing circuitry that describes one or more functions to be included in an ASIC, wherein the one or more functions have connection points providing first inputs and outputs to the one or more functions; and query an integrated circuit shell expressed in a hardware description language, the integrated circuit shell expressing circuitry that describes a limited set of pads to be implemented in the ASIC, wherein the limited set of pads provides second inputs and outputs to the ASIC, wherein the query determines availability of pads of the limited set of pads to connect to the connection points of the one or more functions. In some implementations, the memory may include instructions executable by the processor to cause the system to map available pads of the limited set of pads to the connection points of the one or more functions. In some implementations, the memory may include instructions executable by the processor to cause the system to generate an integrated circuit design expressed in a hardware description language using the integrated circuit core design and the integrated circuit shell, wherein the integrated circuit design corresponds to a SoC. In some implementations, the memory may include instructions executable by the processor to cause the system to generate the integrated circuit shell. In some implementations, the memory may include instructions executable by the processor to cause the system to select the integrated circuit shell from a plurality of integrated circuit shells, wherein integrated circuit shells of the plurality of integrated circuit shells have different configurations for the limited set of pads. In some implementations, the memory may include instructions executable by the processor to cause the system to select the integrated circuit shell from a plurality of integrated circuit shells based on the integrated circuit shell having available pads mapping to the connection points of the one or more functions.

In a third aspect, the subject matter described in this specification can be embodied in a non-transitory computer-readable storage that includes instructions that, when executed by a processor, causes the processor to generate an integrated circuit core design expressed in a hardware description language, the integrated circuit core design expressing circuitry that describes one or more functions to be included in an ASIC, wherein the one or more functions have connection points providing first inputs and outputs to the one or more functions; and query an integrated circuit shell expressed in a hardware description language, the integrated circuit shell expressing circuitry that describes a limited set of pads to be implemented in the ASIC, wherein the limited set of pads provides second inputs and outputs to the ASIC, wherein the query determines availability of pads of the limited set of pads to connect to the connection points of the one or more functions. In some implementations, the instructions that, when executed by the processor, may cause the processor to map available pads of the limited set of pads to the connection points of the one or more functions. In some implementations, the instructions that, when executed by the processor, may cause the processor to generate an integrated circuit design expressed in a hardware description language using the integrated circuit core design and the integrated circuit shell, wherein the integrated circuit design corresponds to a SoC. In some implementations, the instructions that, when executed by the processor, may cause the processor to generate the integrated circuit shell. In some implementations, the instructions that, when executed by the processor, may cause the processor to select the integrated circuit shell from a plurality of integrated circuit shells, wherein integrated circuit shells of the plurality of integrated circuit shells have different configurations for the limited set of pads.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method comprising:
generating an integrated circuit core design expressed in a hardware description language, the integrated circuit core design expressing circuitry that describes one or more functions to be included in an application specific integrated circuit (ASIC), wherein the one or more functions have connection points providing first inputs and outputs to the one or more functions; and
querying an integrated circuit shell expressed in a hardware description language, the integrated circuit shell expressing circuitry that describes a limited set of pads to be implemented in the ASIC, the limited set of pads providing second inputs and outputs to the ASIC, wherein the querying determines availability of pads of the limited set of pads to connect to connection points of the one or more functions.

2. The method of claim 1, further comprising mapping available pads of the limited set of pads to the connection points of the one or more functions.

3. The method of claim 1, further comprising generating an integrated circuit design expressed in a hardware description language using the integrated circuit core design and the integrated circuit shell, wherein the integrated circuit design corresponds to an ASIC that is a system on a chip (SoC).

4. The method of claim 1, further comprising generating the integrated circuit shell.

5. The method of claim 1, further comprising selecting the integrated circuit shell from a plurality of integrated circuit shells, wherein integrated circuit shells of the plurality of integrated circuit shells have different configurations for the limited set of pads.

6. The method of claim 1, further comprising selecting the integrated circuit shell from a plurality of integrated circuit shells based on the integrated circuit shell having available pads mapping to the connection points of the one or more functions.

7. The method of claim 1, wherein the limited set of pads comprises one or more groups of pads, and wherein the querying determines availability of a group of pads for connecting to the connection points of a function of the one or more functions.

8. The method of claim 1, wherein querying the integrated circuit shell comprises executing an application program interface to determine the availability of pads.

9. The method of claim 1, wherein the one or more functions is selected from a group consisting of double data rate (DDR) memory; peripheral component interconnect express (PCIe); general purpose inputs and outputs (GPIOs); universal asynchronous receiver-transmitter (UART); serial peripheral interface (SPI); pulse-width modulation (PWM); and inter-integrated circuit ($I^2C$).

10. A system comprising:
a memory; and
a processor, wherein the memory includes instructions executable by the processor to cause the system to:
generate an integrated circuit core design expressed in a hardware description language, the integrated circuit core design expressing circuitry that describes one or more functions to be included in an ASIC, wherein the one or more functions have connection points providing first inputs and outputs to the one or more functions; and
query an integrated circuit shell expressed in a hardware description language, the integrated circuit shell expressing circuitry that describes a limited set of pads to be implemented in the ASIC, wherein the limited set of pads provides second inputs and outputs to the ASIC, wherein the query determines availability of pads of the limited set of pads to connect to the connection points of the one or more functions.

11. The system of claim 10, wherein the memory includes instructions executable by the processor to cause the system to map available pads of the limited set of pads to the connection points of the one or more functions.

12. The system of claim 10, wherein the memory includes instructions executable by the processor to cause the system to generate an integrated circuit design expressed in a hardware description language using the integrated circuit core design and the integrated circuit shell, wherein the integrated circuit design corresponds to an ASIC that is a SoC.

13. The system of claim 10, wherein the memory includes instructions executable by the processor to cause the system to generate the integrated circuit shell.

14. The system of claim 10, wherein the memory includes instructions executable by the processor to cause the system to select the integrated circuit shell from a plurality of integrated circuit shells, wherein integrated circuit shells of the plurality of integrated circuit shells have different configurations for the limited set of pads.

15. The system of claim 10, wherein the memory includes instructions executable by the processor to cause the system to select the integrated circuit shell from a plurality of integrated circuit shells based on the integrated circuit shell having available pads mapping to the connection points of the one or more functions.

16. A non-transitory computer-readable storage medium that includes instructions that, when executed by a processor, causes the processor to:
generate an integrated circuit core design expressed in a hardware description language, the integrated circuit core design expressing circuitry that describes one or more functions to be included in an ASIC, wherein the one or more functions have connection points providing first inputs and outputs to the one or more functions; and
query an integrated circuit shell expressed in a hardware description language, the integrated circuit shell expressing circuitry that describes a limited set of pads to be implemented in the ASIC, wherein the limited set of pads provides second inputs and outputs to the ASIC, wherein the query determines availability of pads of the limited set of pads to connect to the connection points of the one or more functions.

17. The non-transitory computer-readable storage medium of claim 16, further comprising instructions that, when executed by a processor, causes the processor to map available pads of the limited set of pads to the connection points of the one or more functions.

18. The non-transitory computer-readable storage medium of claim 16, further comprising instructions that, when executed by a processor, causes the processor to generate an integrated circuit design expressed in a hardware description language using the integrated circuit core design and the integrated circuit shell, wherein the integrated circuit design corresponds to an ASIC that is a SoC.

19. The non-transitory computer-readable storage medium of claim 16, further comprising instructions that, when executed by a processor, causes the processor to generate the integrated circuit shell.

20. The non-transitory computer-readable storage medium of claim 16, further comprising instructions that, when executed by a processor, causes the processor to select the integrated circuit shell from a plurality of integrated circuit shells, wherein integrated circuit shells of the plurality of integrated circuit shells have different configurations for the limited set of pads.

* * * * *